No. 636,602. Patented Nov. 7, 1899.
E. V. WILLIAMS.
FERTILIZER DISTRIBUTER.
(Application filed July 10, 1899.)

(No Model.) 2 Sheets—Sheet 1.

Witnesses
Geo. E. Fuch
Chas. R. Wright Jr.

Inventor
E. V. Williams
by A. S. Pattison
Attorney

THE NORRIS PETERS CO., PHOTO-LITHO., WASHINGTON, D. C.

No. 636,602. Patented Nov. 7, 1899.
E. V. WILLIAMS.
FERTILIZER DISTRIBUTER.
(Application filed July 10, 1899.)

(No Model.) 2 Sheets—Sheet 2.

Witnesses
Geo. E. Frech.
Chas. R. Wright

Inventor
E. V. Williams
by A. S. Pattison
Attorney

THE NORRIS PETERS CO., PHOTO-LITHO., WASHINGTON, D. C.

UNITED STATES PATENT OFFICE.

EVERETT V. WILLIAMS, OF IUKA, MISSISSIPPI.

FERTILIZER-DISTRIBUTER.

SPECIFICATION forming part of Letters Patent No. 636,602, dated November 7, 1899.

Application filed July 10, 1899. Serial No. 723,411. (No model.)

*To all whom it may concern:*

Be it known that I, EVERETT V. WILLIAMS, a citizen of the United States, residing at Iuka, in the county of Tishomingo and State of Mississippi, have invented new and useful Improvements in Fertilizer-Distributers, of which the following is a specification.

My invention relates to improvements in phosphate-distributers, and pertains to a distributer adapted to be flexibly connected with a plow-stock, all of which will be fully described hereinafter and particularly pointed out in the claims.

Figure 1:
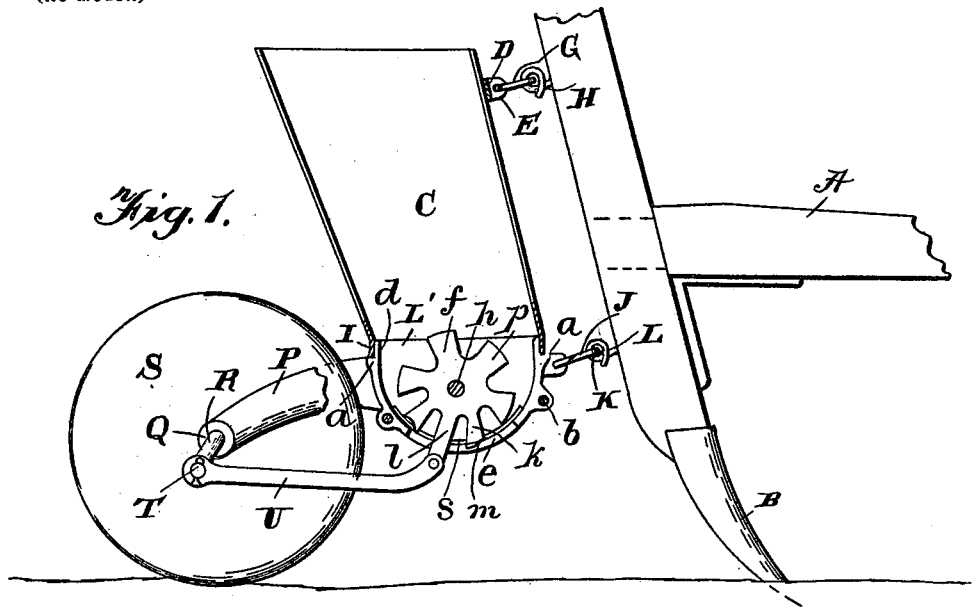
Figure 2:
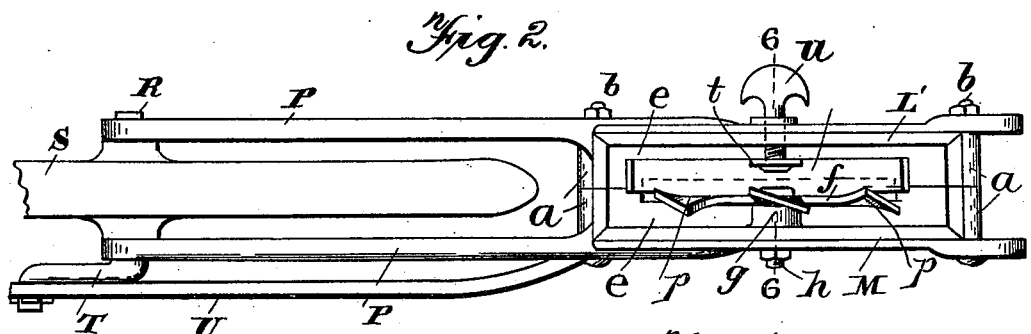
Figures 3, 4:
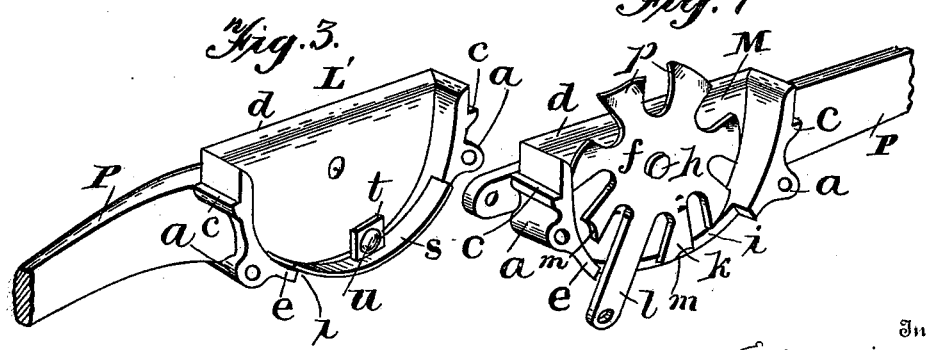
Figure 5:
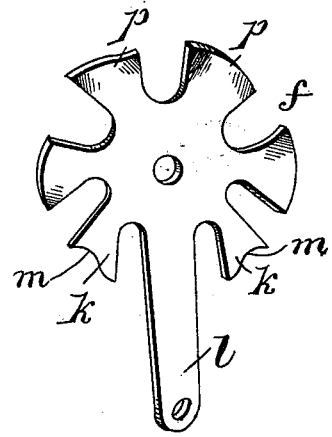
Figure 6:
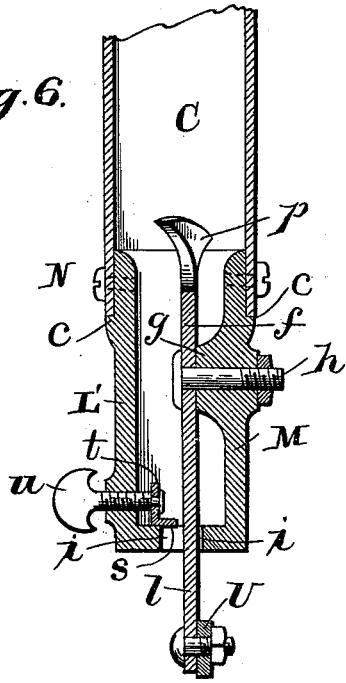
Figure 7:
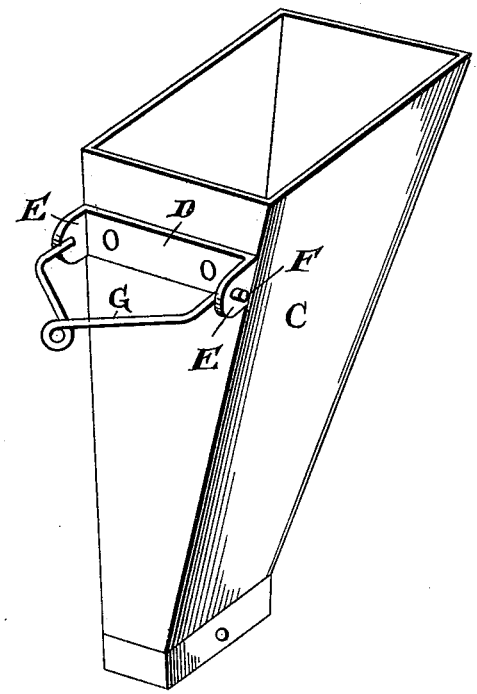

In the accompanying drawings, Figure 1 is a vertical sectional view of my invention, showing it applied to a plow-stock. Fig. 2 is a top plan view of the bottom of the hopper removed therefrom. Fig. 3 is a detached interior view of that part of the hopper which carries the feed-gate. Fig. 4 is a similar view of the opposite side of the bottom of the hopper to which the feed-wheel is journaled and showing the feed-wheel in position therein. Fig. 5 is a detached view of the feed-wheel. Fig. 6 is a transverse sectional view through the bottom of the hopper on the line 6 6 of Fig. 2. Fig. 7 is a detached view of the rear end of the hopper, showing the attachment for connecting the upper end of the hopper with the plow-stock.

Referring now to the drawings, A is an ordinary plow-stock, which has attached to its lower end a plow B of any desired form, according to the character of cultivation it is desired to do.

My invention relates to a fertilizer-distributer which is adapted to be flexibly connected to the plow-stock A in a manner to be fully described hereinafter, whereby it will follow in the furrow made by the plow for the purpose of distributing fertilizer in the furrow when the ground is being prepared for the reception of a crop or when the crop itself is being cultivated.

The invention includes a hopper C, having at its forward upper edge a U-shaped plate D, which has outturned perforated ears E for receiving the outturned ends F of a wire G, said wire having a central eye which catches in an upturned hook H, connected at the proper point to the upper portion of the plow-stock. The bottom I of the hopper is similarly connected to the lower portion of the plow-stock through the medium of the wire J, connected with the bottom, and having a central eye K, adapted to enter an upturned hook L at the lower portion of the plow-stock, all of which is fully illustrated. By means of connections of the form just described it will be seen that the hopper is permitted to oscillate and to rise and fall and to thereby accommodate itself to the inequalities of the furrow produced by the plow.

The bottom I of the hopper consists of two separate U-shaped castings L' and M. Each of these castings is provided with corresponding perforated ears *a*, through which pass the clamping-bolts *b* for clamping the parts together and holding them firmly in their proper relative position. The upper edges of these castings L' and M are provided with the outwardly-extending ribs *c* and the upwardly-extending flanges *d*, the latter adapted to pass within the lower end of the sheet-metal hopper C and the former adapted to properly position the bottom within the lower end of the hopper. The bottom, which consists of the two castings L' and M, as before described, firmly bolted together, is connected with the lower ends of the hopper C by means of screws N, which pass through openings in the lower end of the hopper C and screw into the flanges *b* at the upper edges of the U-shaped castings L' and M, thus serving to firmly unite the bottom to the hopper, but permitting the bottom to be readily removed therefrom for the purpose of repair or for other reasons. Each of the U-shaped castings L' and M is provided with a rearwardly-extending slightly-downwardly-curved arm P, these arms P being integral with the castings and provided at their rear ends with openings Q, which form journals for a drive-shaft R, the drive-shaft R being made fast in any suitable manner to a drive-wheel S of any suitable form, the drive-shaft having one end formed into a crank T to receive the rear end of a pitman U. Each of the castings L' and M has at its edge an inwardly-projecting flange *e*, the edges of which abut when the castings are clamped together, forming a space between the castings, as will be readily understood, which constitutes a feed-chamber into which the phosphate passes from the hopper C and in which feed-chamber is situated a disintegrating and feed wheel $f$. This feed-wheel $f$ is supported solely by and journaled only to the casting M and is entirely independent of the casting L'. The casting M has an inwardly-extending projection $g$, and passing through the feed-wheel is a headed bolt $h$, which screws into the said projection and forms a journal for the feed-wheel. The lower edges of the flanges $e$ of the casting are cut away to form registering recesses $i$, which form an opening for the passage of the fertilizer, and the lower teeth $k$ of the feed-wheel rest within this slot and practically against the wall of the recess formed in the flange of the casting M, for a purpose to be presently described. This feed-wheel is provided with a downwardly and outwardly projecting operating-arm $l$, to which the inner end of the pitman U is suitably connected and by means of which the feed-wheel is oscillated when the drive-wheel is rotated by contact with the furrow formed by the plow. The two teeth $k$, one of which is situated at each side of the operating-arm of the feed-wheel, are provided with notches $m$ in their outer ends, constituting sharp teeth for disintegrating and feeding the phosphate through the slits in the bottom of the feed-chamber. The upper blades $p$ of this feed-wheel are turned laterally into propeller form and which also have cutting edges whereby the phosphate is stirred and the lumps thereof are broken up, thus facilitating the feeding of the phosphate through the feeding-chamber and through the slots at the bottom thereof. It will also be noted that this feed-wheel is made of a diameter which causes it to project above the contracted feed-chamber into the lower end of the hopper C, so that the propeller-shaped upper teeth extend within the lower end of the hopper and stir the material and cause it to be fed therefrom within the contracted feed-chamber, in which any lumps are crushed by the saw-shaped teeth. It will also be noted that the edges of the recesses which form the teeth in this feed-wheel are made abrupt, so that they are sharp and will cut and disintegrate the phosphate thoroughly and cause it to more evenly feed through the recess in the bottom of the feed-chamber. By referring to the feed-chamber as a "contracted" feed-chamber it is meant that it is small or contracted in comparison with the lower end of the hopper, so that the feed-wheel will engage and feed all of the phosphate that is fed within this chamber, and thus enabling the wheel to more thoroughly crush and disintegrate the phosphate than would be possible if the feed-chamber were a large one.

The casting L' opposite the casting M carries an adjustable gate $s$ for the purpose of regulating the size of the feed-opening, and this gate consists of a curved plate, as shown, with an upwardly-extending ear $t$, which receives the inner end of a thumb-screw $u$, which passes through the casting L' from the outer side thereof. Since the lower teeth of the feed-wheel are against or practically against the wall of the recess in the casting M and the gate being carried by the casting L', it is movable across the recess and toward the feed-wheel, so that the feeding-opening can be regulated by the movement of this curved plate across the said recess, as will be readily understood.

From the above description it will be noted that one of these castings—namely, the casting M—carries and supports the feed-wheel independently of the casting L', and that the casting L' carries and supports the adjustable gate independently of the casting M, and that when these castings are separated the casting M carries the feed-wheel, the drive-wheel, and the pitman, while the casting L' carries the feed-gate. This arrangement is simple; but it enables the machine to be readily assembled and to be readily taken apart for the purpose of examining it or for the purpose of repair.

By a machine of the above character the fertilizer-distributer can be readily hooked upon or detached from an ordinary plow-stock for the purpose of distributing phosphate at any desired stage in the cultivation of soil.

Having thus described my invention, what I claim, and desire to secure by Letters Patent, is—

1. A fertilizer-distributer comprising a hopper, and a detachable bottom constituting a feed-chamber having a feed-opening in its lower end, a feed-wheel within the chamber, the bottom provided with rearwardly-extending drive-wheel-supporting arms, and a pitman connecting the drive-wheel and the feed-wheel, substantially as described.

2. A phosphate-distributer comprising a hopper, a bottom composed of two sections detachably connected to each other and to the hopper, one of said sections carrying a feed-wheel with its upper periphery projecting within the bottom of the hopper and having a downwardly-projecting arm extending through the bottom of the feed-chamber, a drive-wheel, and a pitman connecting the drive-wheel and the downwardly-projecting arm of the feed-wheel, substantially as described.

3. A phosphate-distributer comprising a hopper, a detachable bottom constituting an essentially U-shaped feed-chamber, a feed-wheel journaled to the bottom, the bottom having an elongated feed-opening, the feed-wheel having an arm projecting through the said opening, the bottom having at opposite sides rearwardly-projecting parallel arms, a drive-wheel journaled between the rear ends of these arms, and a pitman connecting the drive-wheel and the operating-arm of the feed-wheel, substantially as described.

4. A machine of the character described comprising a hopper, a separate bottom constituting a feed-chamber, the bottom consisting of two separate members, having rearwardly-extending drive-wheel-supporting arms, a drive-wheel supported between the said arms, a feed-wheel within the feed-chamber and supported by the bottom, the feed-wheel having an operating-arm, and a pitman connecting the drive-wheel and the operating-arm of the feed-wheel, substantially as described.

5. A machine of the character described comprising a hopper, a bottom for the hopper constituting a feed-chamber, the bottom consisting of two separate members, a feed-wheel journaled to one of said members, the bottom provided with a rearwardly-extending drive-wheel-supporting arm, the feed-wheel having an operating-arm and a pitman connecting the drive-wheel and the operating-arm of the feed-wheel, substantially as described.

6. A machine of the character described comprising a hopper, a bottom consisting of two members constituting an essentially U-shaped feed-chamber provided with a feed-opening in the bottom thereof, a feed-wheel journaled to one of said members, and an adjustable gate for said feed-opening carried by the other member, a drive-wheel, and an operating connection between the drive-wheel and the feed-wheel, substantially as described.

7. A machine of the character described comprising a hopper, a detachable bottom therefor carrying a feed mechanism and a driving mechanism operatively connected with the feed mechanism and independently of the hopper, substantially as described.

8. A machine of the character described comprising a hopper, two separate members constituting a bottom for the hopper and each member having an inwardly-extending abutting flange constituting a feed-chamber, a feed-wheel supported by the bottom and situated within the feed-chamber, the bottom of the feed-chamber having an elongated feed-opening, the feed-wheel provided with an operating-arm projecting through the said opening, the bottom provided with a rearwardly-projecting drive-wheel-supporting arm, and a pitman connecting the drive-wheel and the feed-wheel-operating arm, substantially as described.

9. In a machine of the character described, a feed-wheel consisting of a plate having peripheral recesses constituting teeth, and at its lower edge a projecting operating-arm, the teeth at each side of said operating-arm formed in the shape of saw-teeth, and the upper teeth of the feed-wheel formed in propeller shape, substantially as and for the purpose described.

10. In a machine of the character described, a feeding-chamber and a feed-wheel having propeller-shaped upper teeth and straight lower cutting-teeth and an operating-arm projecting down from between two of the cutting-teeth, substantially as described.

In testimony whereof I have hereunto set my hand in the presence of two subscribing witnesses.

EVERETT V. WILLIAMS.

Witnesses:
  H. C. HARRIS,
  B. F. McRAE, Jr.